United States Patent
Choi (10) Patent No.: US 7,649,600 B2
(45) Date of Patent: Jan. 19, 2010

(54) LIQUID CRYSTAL DISPLAY DEVICE HAVING OCB MODE LIQUID CRYSTAL LAYER

(75) Inventor: Kyung-Ho Choi, Ulsan-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 353 days.

(21) Appl. No.: 11/271,406

(22) Filed: Nov. 9, 2005

(65) Prior Publication Data
US 2006/0114386 A1    Jun. 1, 2006

(30) Foreign Application Priority Data
Nov. 26, 2004   (KR) ................ 10-2004-0098264

(51) Int. Cl.
*G02F 1/1337* (2006.01)
*G02F 1/1339* (2006.01)
(52) U.S. Cl. ............... 349/123; 349/132; 349/156
(58) Field of Classification Search ......... 349/128–130, 349/61–71, 123, 156, 132
See application file for complete search history.

(56) References Cited

U.S. PATENT DOCUMENTS

| | | | |
|---|---|---|---|
| 5,327,271 A * | 7/1994 | Takeuchi et al. ............ 349/88 |
| 6,476,898 B2 * | 11/2002 | Song et al. ............... 349/139 |
| 6,504,592 B1 * | 1/2003 | Takatori et al. ............ 349/129 |
| 6,583,835 B1 * | 6/2003 | Yoshida et al. ............ 349/124 |
| 6,633,357 B2 * | 10/2003 | Ko et al. ................... 349/129 |
| 6,724,452 B1 * | 4/2004 | Takeda et al. ............. 349/139 |
| 6,753,551 B2 * | 6/2004 | Cheng ...................... 257/79 |
| 6,859,246 B2 * | 2/2005 | Konno et al. .............. 349/128 |
| 7,190,429 B2 * | 3/2007 | Yoshida et al. ............ 349/141 |
| 2001/0006408 A1 * | 7/2001 | Matsuyama et al. ....... 349/143 |
| 2001/0019386 A1 * | 9/2001 | Lee et al. .................. 349/123 |

(Continued)

FOREIGN PATENT DOCUMENTS

JP    2002-098974    4/2002

(Continued)

OTHER PUBLICATIONS

Patent Abstracts of Japan, Publication No. 2002-296596; Publication Date Oct. 9, 2002; in the name of Shioda, et al.

(Continued)

*Primary Examiner*—Julie Ngo
(74) *Attorney, Agent, or Firm*—Christie, Parker & Hale, LLP (57) ABSTRACT

A liquid crystal display device includes: a pixel electrode located on a lower substrate; a lower alignment layer located on the pixel electrode and having a predetermined alignment direction (or aligned in a predetermined direction); an upper substrate located apart from the lower substrate and having an opposite surface facing the lower substrate; an opposite electrode located on the opposite surface; an upper alignment layer located on the opposite electrode and having the predetermined alignment direction of the lower alignment layer; an upper protrusion line located between the upper substrate and the upper alignment layer and arranged in a direction crossing the predetermined alignment direction; and an optically compensated bend (OCB) mode liquid crystal layer located between the lower alignment layer and the upper alignment layer.

39 Claims, 9 Drawing Sheets

U.S. PATENT DOCUMENTS

| | | | |
|---|---|---|---|
| 2001/0026341 A1* | 10/2001 | Lee et al. | 349/123 |
| 2003/0048401 A1* | 3/2003 | Hanaoka et al. | 349/123 |
| 2003/0174269 A1* | 9/2003 | Tanaka et al. | 349/129 |
| 2004/0109664 A1* | 6/2004 | Ohtsuki et al. | 385/146 |
| 2004/0119924 A1* | 6/2004 | Takeda et al. | 349/129 |
| 2005/0162594 A1* | 7/2005 | Sasabayashi | 349/123 |

FOREIGN PATENT DOCUMENTS

| | | |
|---|---|---|
| JP | 2002-296596 | 10/2002 |
| JP | 2003-075873 | 3/2003 |
| JP | 2005-070448 | 3/2005 |
| KR | 2001-0060522 | 7/2001 |
| KR | 2002-0097025 | 12/2002 |

OTHER PUBLICATIONS

Korean Patent Abstracts, Publication No. 1020010060522 A; Publication Date Jul. 7, 2001; in the name of Lee, et al.

Korean Patent Abstracts, Publication No. 1020020097025 A; Publication Date Dec. 31, 2002; in the name of Konno, et al.

Korean Office action dated Apr. 17, 2006 for Korean priority 10-2004-0098264.

Japanese Office action dated Jul. 28, 2009, for corresponding Japanese application 2005-200717, noting listed references in this IDS.

Japanese Office action dated Nov. 24, 2009, for corresponding Japanese application 2005-200717 noting the listed reference in this IDS, as well as JP 2003-075873, previously filed in an IDS dated Sep. 25, 2009.

* cited by examiner

LIQUID CRYSTAL DISPLAY DEVICE HAVING OCB MODE LIQUID CRYSTAL LAYER

CROSS-REFERENCE TO RELATED APPLICATION

This application claims priority to and the benefit of Korean Patent Application No. 10-2004-0098264, filed on Nov. 26, 2004, the entire content of which is incorporated herein by reference.

BACKGROUND OF THE INVENTION

1. Field of the Invention

The present invention relates to a liquid crystal display (LCD) device and, more particularly, to an LCD device having an optically compensated bend (OCB) mode liquid crystal layer.

2. Description of the Related Art

An LCD device has a liquid crystal injected between a pixel electrode and an opposite electrode, and changes alignment of the liquid crystal by forming an electric field between the pixel electrode and the opposite electrode. The changed alignment of the liquid crystal controls transmittance of light to form images.

Of the various types of LCD devices, an optically compensated bend ("OCB") mode LCD device has a fast response speed and an excellent viewing angle. The OCB mode LCD device includes a pixel electrode, a lower alignment layer, an opposite electrode, an upper alignment layer, and a liquid crystal layer having a positive dielectric constant anisotropy $\Delta\in$. The lower and upper alignment layers are rubbed (and/or coated) in the same direction, so that the liquid crystals have a splay alignment.

In order to form images in the OCB mode LCD device, a high electric field should be formed between the pixel electrode and the opposite electrode. The high electric field changes a tilt angle of the liquid crystals located at a central portion of the liquid crystal layer to an angle of 90° so that the liquid crystals have a bend alignment. This is referred to as a bend transition. Subsequently, a predetermined voltage is applied between the pixel electrode and the opposite electrode to induce a change of a tilt angle of the rest of the liquid crystals other than the liquid crystals adjacent to the alignment layers and the liquid crystals located at the central portion. Thus, polarization of light which passes through the liquid crystal layer is changed to form images.

In order for this LCD device having a plurality of pixels to implement high resolution images, most of the liquid crystals arranged in the plurality of pixels should be bend-transited. However, this requires a lot of time, and pixels which are not bend-transited may still occur. In order to prevent this, a voltage is increased for the bend transition, leading to high power consumption.

In order to resolve the above problem, an LCD device having protrusions is disclosed in a Korean Patent Publication (No. 2001-60522). The LCD device includes upper and lower substrates (or first and second substrates) which are facing each other. First and second electrodes are respectively formed on respective inside surfaces of the first and second substrates. Protrusions are disorderedly formed at corresponding locations on each of the first and second electrodes, and alignment layers are formed to cover the protrusions on the respective electrodes. A nematic liquid crystal layer having a positive dielectric constant anisotropy is injected between the alignment layers of the two substrates. Liquid crystal molecules of the liquid crystal layer are aligned to have a predetermined angle to a surface of the substrate along a tilt angle of the protrusions by an anchoring force of the alignment layer, so that they can have a stable bend alignment. As a result, an initial transition voltage can be lowered.

An LCD device having a structure of promoting a propagation of transition is disclosed in a Japanese Patent Publication (No. 2002-296596). The LCD device includes an array substrate and an opposite substrate with a liquid crystal layer interposed therebetween. The structure of promoting the propagation of transition is located on either of the array and opposite substrates. The structure of promoting the propagation of transition may be an electrode wire line for propagation or a protruding portion.

An LCD with transition nucleus areas is disclosed in a Korean Patent Publication (No. 2002-97025). The LCD device includes first and second substrates, a plurality of pixel electrodes formed on the first substrate, and a common electrode formed on the second substrate. A first transition nucleus area with a plurality of continuous slant surfaces having a saw-tooth cross-sectional profile is formed on the first substrate layer. A second transition nucleus area with a plurality of continuous slant surfaces having a saw-tooth cross-sectional profile is formed on the second substrate.

However, the prior art described above does not provide (or define) a location of protrusions according to a rubbing direction, and thus it may be difficult to implement sufficient bend transition. In the case disclosed in the Korean Patent Publication (No. 2002-97025), it may also be difficult to continuously form the saw tooth profile in a small area.

SUMMARY OF THE INVENTION

An embodiment of the present invention provides an LCD device which can induce a sufficient bend transition using a relatively simple process.

One embodiment of the present invention provides a liquid crystal display device including: a pixel electrode located on a lower substrate; a lower alignment layer located on the pixel electrode and having a predetermined alignment direction (or aligned in a predetermined direction); an upper substrate located apart from the lower substrate and having an opposite surface facing the lower substrate; an opposite electrode located on the opposite surface; an upper alignment layer located on the opposite electrode and having the predetermined alignment direction of the lower alignment layer (or having a second alignment direction that is substantially the same as the predetermined alignment direction); an upper protrusion line located between the upper substrate and the upper alignment layer and arranged in a direction crossing the predetermined alignment direction (and/or a lower protrusion line located between the lower substrate and the lower alignment layer and arranged in a direction crossing the predetermined alignment direction); and an OCB mode liquid crystal layer located between the lower alignment layer and the upper alignment layer.

BRIEF DESCRIPTION OF THE DRAWINGS

The accompanying drawings, together with the specification, illustrate exemplary embodiments of the present invention, and, together with the description, serve to explain the principles of the invention.

DETAILED DESCRIPTION

In the following detailed description, exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive. There may be parts shown in the drawings, or parts not shown in the drawings, that are not discussed in the specification, as they are not essential to a complete understanding of the invention. Like reference numerals designate like elements. In a case where it is stated that one layer is formed "on" another layer, this may refer to the one layer being directly on the another layer or to a third layer being interposed between the one layer and the another layer.

Figure 1:
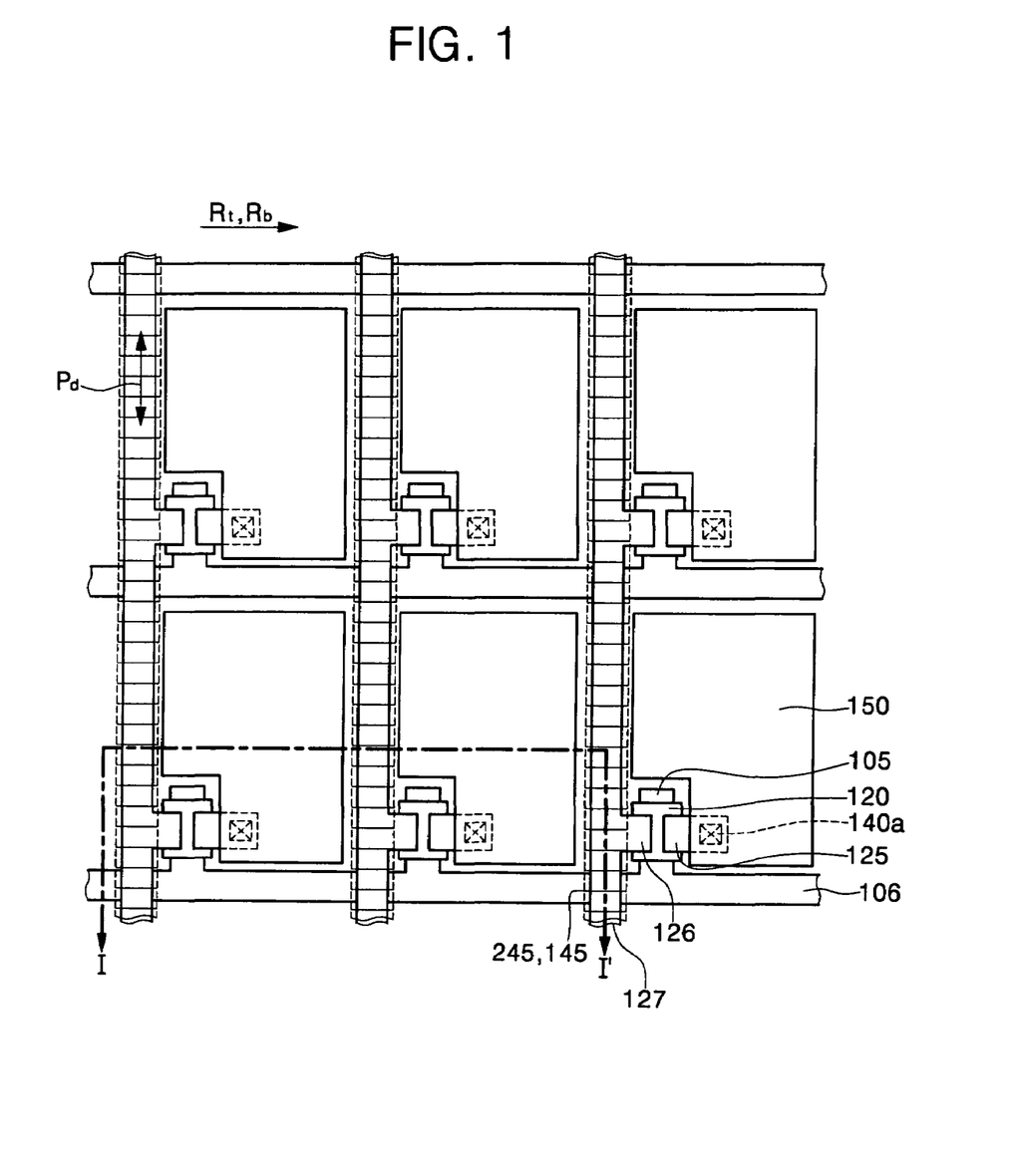
FIGS. 1, 2, 3, and 4 are layout views illustrating an LCD device according to certain embodiments of the present invention.
Figure 5:
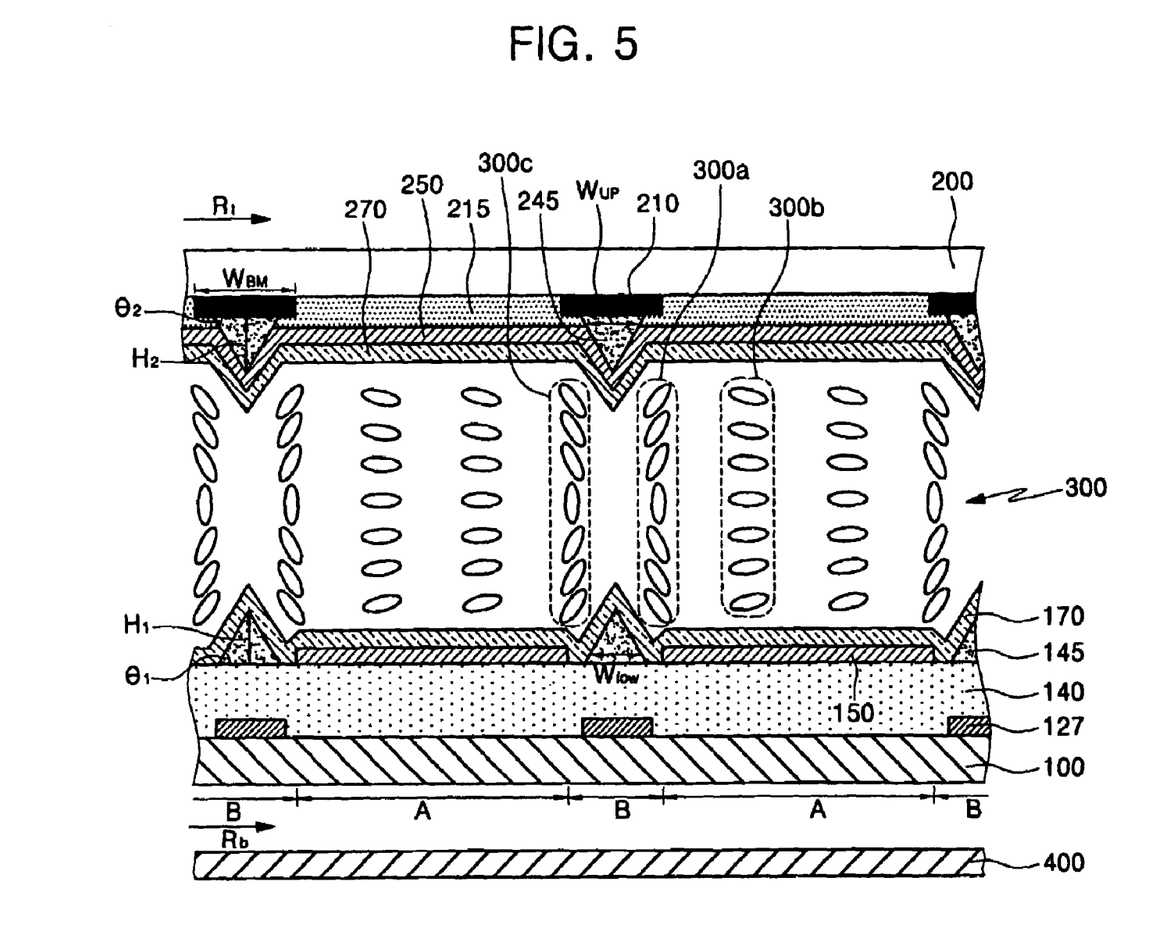
FIG. 5 is a cross-sectional view, taken along line I-I' of FIG. 1, illustrating an LCD device according to an embodiment of the present invention and a manufacturing method of the same.

FIG. 1 is a layout view illustrating an LCD device according to an embodiment of the present invention, and FIG. 5 is a cross-sectional view taken along the line I-I' of FIG. 1.

Referring to FIGS. 1 and 5, a lower substrate 100 having an opening area A and a non-opening area B which surrounds the opening area A is provided. The opening area A is an area through which an image is displayed and may be defined by a pixel electrode 150.

On the non-opening area B, at least one of a plurality of scan lines 106 is arranged in a first direction, and at least one of a plurality of data lines 127 is arranged in a second direction perpendicular to the first direction of the at least one of the scan lines 106.

On the non-opening area B, at least one of a plurality of thin film transistors (TFTs) is arranged. The at least one of the TFTs is switched by one or more control signals of the scan lines 106 to apply one or more voltages applied to the data lines 127 to the pixel electrode 150. Each of the TFTs includes a gate electrode 105 extending from a corresponding one of the scan lines 106, a semiconductor layer 120 which overlaps over the gate electrode 105, a source electrode 126 which extends from a corresponding one of data lines 127 and contacts one end of the semiconductor layer 120, and a drain electrode 125 which contacts the other end of the semiconductor layer 120.

An insulating layer 140 is arranged to cover the scan and data lines 106 and 127 and the TFTs. The pixel electrode 150 is arranged on the insulating layer 140 on the opening area A, and the drain electrode 125 contacts the pixel electrode 150 through a via hole 140a provided in the insulating layer 140. The pixel electrode 150 may be formed using indium tin oxide (ITO) or indium zinc oxide (IZO).

Figure 9:
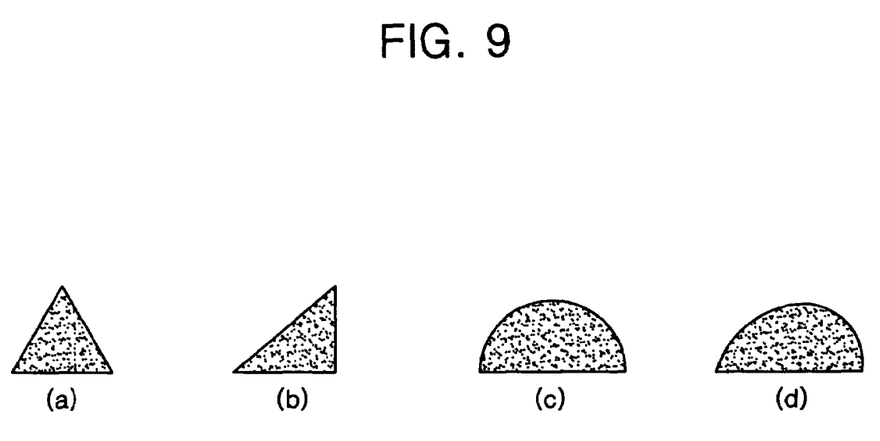
FIG. 9 is a cross-sectional view illustrating various exemplary shapes of protrusions.

On at least a part of the insulating layer 140 above the non-opening area B, a lower protrusion line 145 is arranged apart from the pixel electrode 150. The lower protrusion line 145 may be formed using an organic or inorganic layer. The organic layer may be formed using an acrylic-based polymer layer or a benzocyclobutene (BCB) layer, and the inorganic layer may be formed using a silicon oxide layer or a silicon nitride layer. In one embodiment, at least one side of the lower protrusion line 145 has a slope. In a case where both sides of the lower protrusion line 145 have a slope, the slopes may be symmetric or asymmetric. For example, as shown in FIG. 9, the lower protrusion line 145 may have a triangular cross section (a) having symmetric slopes, a triangular cross section (b) having asymmetric slopes, a half-circular cross section (c) having symmetric slopes, and/or a half-circular cross section (d) having asymmetric slopes. An angle of the slope, i.e., an angle $\theta_1$ formed by the slope and the lower substrate 100, is in a range from 10° to 80°. In a case where the angle $\theta_1$ is less than 10°, an efficiency resulting from the lower protrusion line 145 may be reduced because the same effect can be obtained by an alignment treatment for a lower alignment layer 170 which will be explained later. In a case where the angle $\theta_1$ exceeds 80°, a bend-transition efficiency resulting from the angle $\theta_1$ may be reduced. In one embodiment, the angle $\theta_1$ is in a range from 10° to 60° so that a bend alignment can be more stabilized.

The protrusion line 145 in which at least one side has a slope may be formed using a press technique, an oblique evaporation technique, a photolithography technique, and/or a laser beam machining technique. In more detail, the protrusion line 145 may be formed using the press technique such that an organic layer is deposited on the insulating layer 140, then a mold having grooves is placed on the organic layer, next heat and pressure are applied to the mold and then cooled, and finally the mold is separated from the substrate 100. The protrusion line 145 may be formed using the oblique evaporation technique by depositing a protrusion material at a predetermined tilt angle against the substrate 100. The protrusion line 145 may be formed using the photolithography technique such that a protrusion material is deposited on the substrate 100, then a photoresist is formed on the protrusion material, next the photoresist is exposed to light using a photo mask having a pattern which continuously changes light transmittance to thereby form a photoresist pattern, and finally the protrusion material is etched using the photoresist pattern as a mask. The protrusion line 145 may be formed using the laser beam machining technique such that a protrusion material is deposited on the substrate 100, and then a laser beam is irradiated to the protrusion material at a predetermined tilt angle.

The lower alignment layer 170 is arranged to cover the lower protrusion line 145 and the pixel electrode 150. The lower alignment layer 170 may be formed using an organic or inorganic layer. In one embodiment, the lower alignment layer 170 is formed using a polyimide-like organic layer. The lower alignment layer 170 may be parallel-aligned or tilt-aligned to have a predetermined tilt angle in which an alignment treatment is performed in a predetermined direction Rb. The alignment treatment may be performed using a rubbing technique or a photo-alignment technique. Generally, a pretilt angle for the tilt alignment is less than 10°.

Here, the placement direction Pd of the lower protrusion line 145 crosses the alignment direction Rb of the lower alignment layer 170. Hence, a major axis direction of a liquid crystal adjacent to the lower alignment layer 170 can be placed upwardly along the slope with the angle $\theta_1$. As a result, a pretilt angle of a liquid crystal adjacent to the lower alignment layer 170 can be increased (or adjusted) to be substantially the same as the tilt angle $\theta_1$. In one embodiment, the alignment direction Rb is substantially perpendicular to the placement direction Pd of the lower protrusion line 145.

Figure 2:
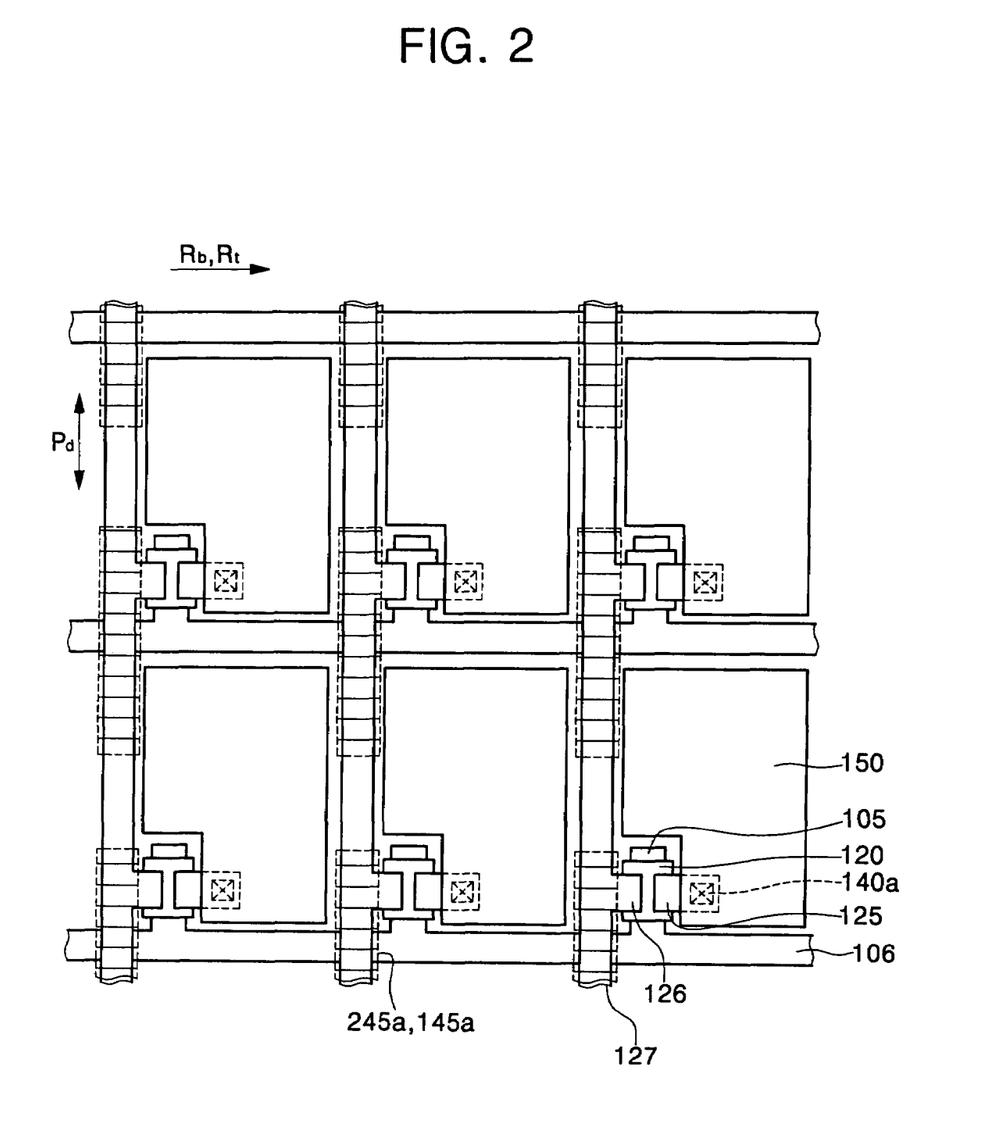
Figure 3:
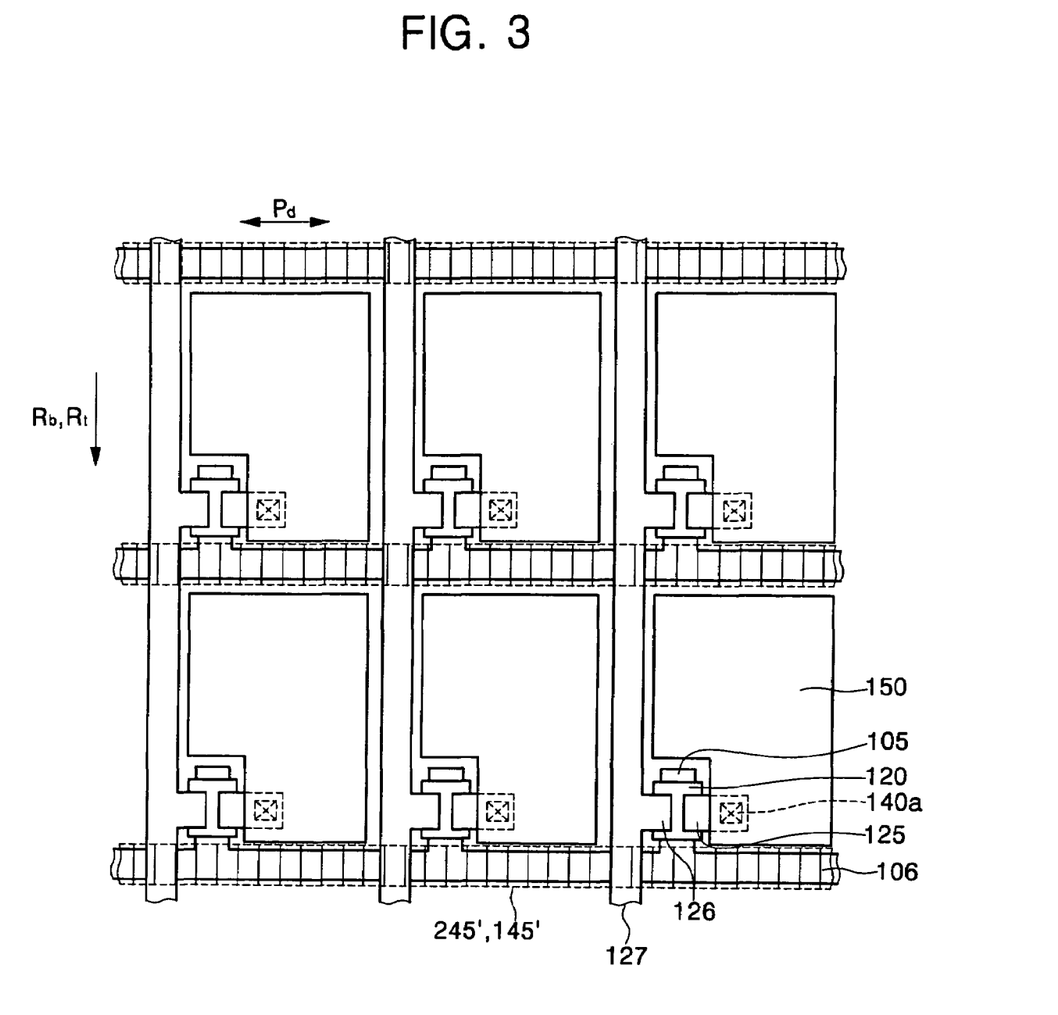
Figure 4:
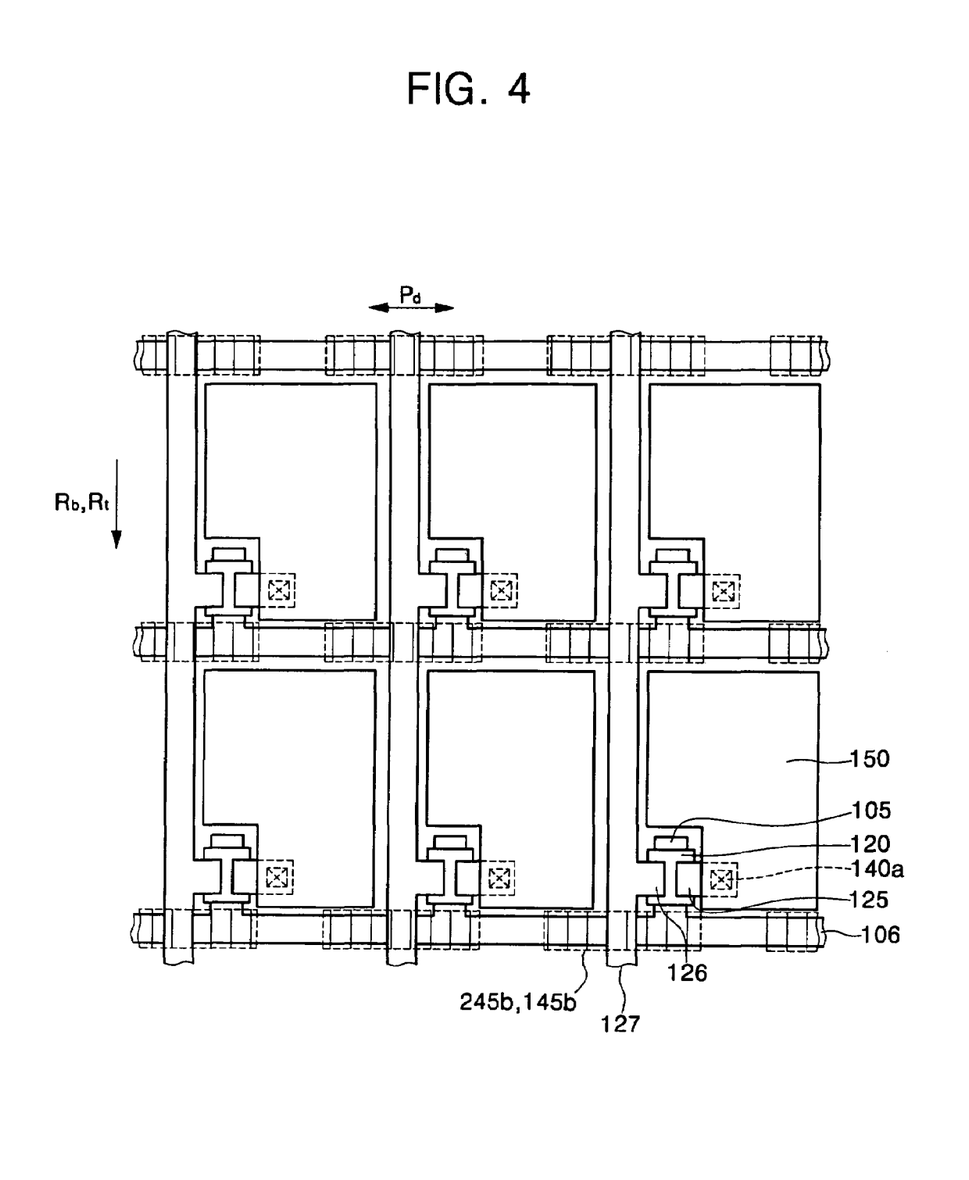

For example, as shown in FIG. 1, the lower protrusion line 145 may be arranged in an up-down (or vertical) direction of FIG. 1 on the non-opening areas (e.g., the non-opening area B) which are arranged on right and left (or first and second vertical) sides of the pixel electrode 150 of FIG. 1. That is, the lower protrusion line 145 may extend along the data line 127. In such an instance, the alignment direction Rb may be a direction that crosses the right and left sides of the pixel electrode 150. Alternatively, as shown in FIG. 2, the lower protrusion line 145 of FIG. 1 may be substituted (or added) with sub-protrusion lines 145a which are separated from each other. In addition, as shown in FIG. 3, a lower protrusion line 145' may be arranged in a right-left (or horizontal) direction of FIG. 3 on the non-opening areas which are arranged on up and down (or top and bottom or first and second horizontal) sides of the pixel electrode 150 of FIG. 3. That is, the lower protrusion line 145' may extend along the scan line 106. In this case, the alignment direction Rb may be a direction that crosses the up and down side of the pixel electrode 150. Furthermore, as shown in FIG. 4, the lower protrusion line 145' of FIG. 3 may be substituted (or added) with sub-protrusion lines 145b which are separated from each other.

Referring now back to FIGS. 1 and 5, an upper substrate 200 having an opposite surface is arranged above the lower substrate 100. The opposite surface is opposing the lower substrate 100. A light shielding layer pattern 210 may be arranged on the upper substrate 100 corresponding to the non-opening area B. That is, the light shielding layer pattern 210 shields areas corresponding to areas where the at least one of the TFTs, at least one of the scan lines 106, and at least one of the data lines 127 are located and exposes an area corresponding the opening area A. Hence, the light shielding layer pattern 210 is arranged to overlap the lower protrusion line 145. In one embodiment, a width $W_{low}$ of the lower protrusion line 145 is the same as or smaller than a width $W_{BM}$ of the shielding layer pattern 210. In one embodiment, the width $W_{low}$ of the lower protrusion line 145 is smaller than the width $W_{BM}$ of the shielding layer pattern 210.

On an area exposed by the light shielding layer pattern 210, i.e., an area corresponding to the pixel electrode 150, a color filter 215 may be arranged. The color filter 215 may include red, green and blue color filters, each of which corresponds to each unit pixel.

An upper protrusion line 245 is arranged on the light shielding layer pattern 210. At least one side of the upper protrusion line 245 has a slope. In a case where both sides of the upper protrusion line 245 have a slope, the slopes may be symmetric or asymmetric. For example, as shown in FIG. 9, the upper protrusion line 245 may have a triangular cross section (a) having symmetric slopes, a triangular cross section (b) having asymmetric slopes, a half-circular cross section (c) having symmetric slopes, and/or a half-circular cross section (d) having asymmetric slopes. An angle of the slope, i.e., an angle $\theta_2$ formed by the slope and the upper substrate 200, is in a range from 10° to 80°. In a case where the angle $\theta_2$ is less than 10°, an efficiency resulting from the upper protrusion line 245 may be reduced because the same effect can be obtained by an alignment treatment for an upper alignment layer 270 which will be explained later. In a case where the angle $\theta_2$ exceeds 80°, a bend-transition efficiency resulting from the angle $\theta_2$ may be reduced. In one embodiment, the angle $\theta_2$ is in a range from 10° to 60° so that a bend alignment can be more stabilized.

A method of forming the upper protrusion line 245 and a material thereof are substantially the same as those of the lower protrusion line 145.

An opposite electrode 250 is arranged to cover the upper protrusion line 245 and the color filter 215. In other words, the opposite electrode 250 is arranged on the opposite surface of the upper substrate 200 having the upper protrusion line 245. The opposite electrode 250 may be an indium tin oxide (ITO) layer or an indium zinc oxide (IZO) layer.

The upper alignment layer 270 may be arranged on the upper opposite electrode 250. The upper alignment layer 270 may be formed using an organic or inorganic layer. In one embodiment, the upper alignment layer 270 is formed using a polyimide-like organic layer. The upper alignment layer 270 may be parallel-aligned or tilt-aligned to have a predetermined tilt angle, in which an alignment treatment is performed in a direction Rt that is substantially the same as the alignment direction Rb of the lower alignment layer 170. The alignment treatment may be performed using a rubbing technique or a photo-alignment technique.

Here, the upper protrusion line 245 is arranged at a location corresponding to the lower protrusion line 145. In more detail, the placement direction Pd of the upper protrusion line 245 crosses the alignment direction Rt of the upper alignment layer 270. Hence, a major axis direction of a liquid crystal adjacent to the upper alignment layer 270 can be placed upwardly along the slope with the angle $\theta_2$. As a result, a pretilt angle of a liquid crystal adjacent to the upper alignment layer 270 can be increased (or adjusted) to be substantially the same as the tilt angle $\theta_2$. In one embodiment, the alignment direction Rt is substantially perpendicular to the placement direction Pd of the upper protrusion line 245.

For example, as shown in FIG. 1, the upper protrusion line 245 may be arranged in an up-down (or vertical) direction of FIG. 1 on the non-opening areas which are arranged on right and left (or first and second vertical) sides of the pixel electrode 150 of FIG. 1. That is, the upper protrusion line 245 may extend along the data line 127. In such an instance, the alignment direction Rt may be a direction that crosses the right and left sides of the pixel electrode 150. Alternatively, as shown in FIG. 2, the upper protrusion line 245 of FIG. 1 may be substituted (or added) with sub-protrusion lines 245a which are separated from each other. In addition, as shown in FIG. 3, an upper protrusion line 245' may be arranged in a right-left (or horizontal) direction of FIG. 3 on the non-opening areas which are arranged on up and down (or top and bottom or first and second horizontal) sides of the pixel electrode 150 of FIG. 3. That is, the upper protrusion line 245' may extend along the scan line 106. In this case, the alignment direction Rt may be a direction of crossing the up and down of the pixel electrode 150. Furthermore, as shown in FIG. 4, the upper protrusion line 245' of FIG. 3 may be substituted (or added) with sub-protrusion lines 245b which are separated from each other.

The upper protrusion line 245 is arranged to overlap the light shielding layer pattern 210. Here, in an area where the light shielding layer pattern 210 and the upper protrusion line 245 overlap, width $W_{up}$ of the upper protrusion line 245 should be the same as or smaller than width $W_{BM}$ of the shielding layer pattern 210.

Figure 7:
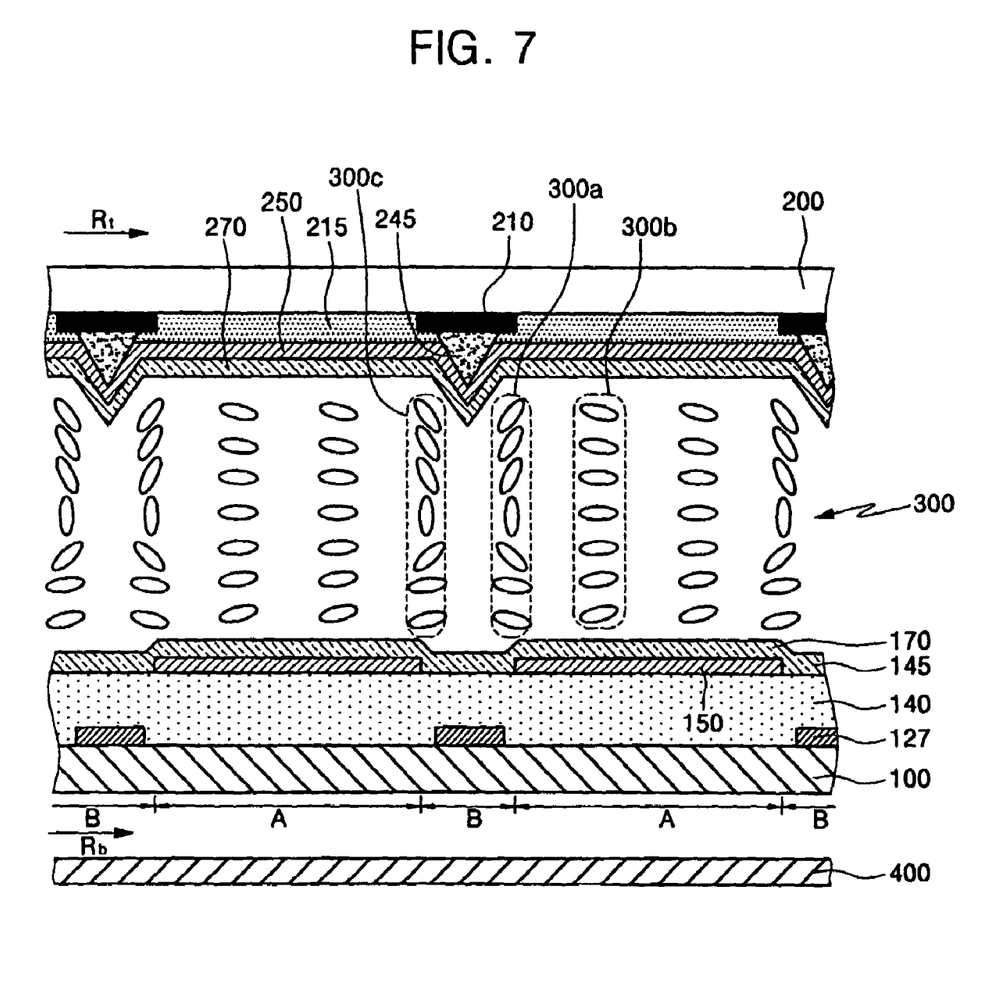
FIGS. 7 and 8 are cross-sectional views taken along line I-I' of FIG. 1, illustrating liquid crystal display devices according to certain other embodiments of the present invention.
Figure 8:
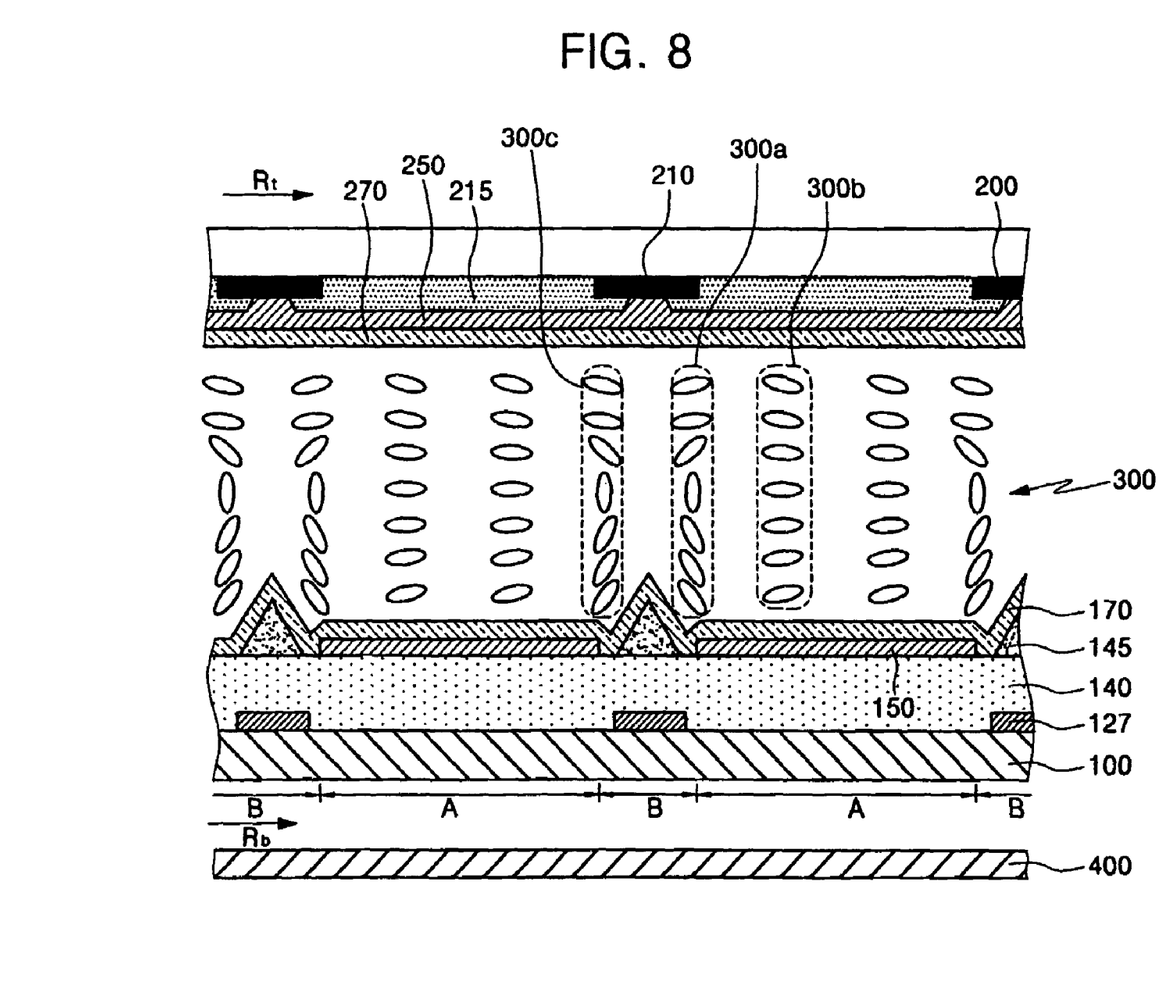

Alternatively, as shown in FIG. 7, the lower protrusion line 145 may be omitted in one embodiment. Also, as shown in FIG. 8, the upper protrusion line 245 may be omitted in one embodiment.

Referring back to FIGS. 1 and 5, an OCB mode liquid crystal layer 300 is arranged between the lower alignment layer 170 and the upper alignment layer 270, i.e., between the pixel electrode 150 and the opposite electrode 250. The OCB mode liquid crystal layer 300 may include nematic liquid crystals having a dielectric constant anisotropy that is positive. In one embodiment, the liquid crystals of the liquid crystal layer 300 are classified into liquid crystals 300b which are located apart from the protrusion lines 145 and 245 and liquid crystals 300a and 300c which are located adjacent to the protrusion lines 145 and 245.

Among the liquid crystals 300b which are located apart from the protrusion lines 145 and 245, the lower and upper liquid crystals which are respectively adjacent to the lower and upper alignment layers 170 and 270 are parallel-aligned or tilt-aligned with a pretilt angle of less than 10° in the alignment directions Rb and Rt due to the anchoring force of the alignment layers 170, 270. However, because the placement directions Pd of the upper and lower protrusion lines 245 and 145 cross the alignment directions Rb and Rt, among the liquid crystals 300a and 300c which are located adjacent to the protrusion lines 145 and 245, the lower liquid crystals which are adjacent to the lower alignment layer 170 and the upper liquid crystals which are adjacent to the upper alignment layer 270 have a larger pretilt angle than other portions respectively due to the anchoring force of the lower alignment layer 170 which covers the lower protrusion line 145 and the anchoring force of the upper alignment layer 270 which covers the upper protrusion line 245.

Figure 10:
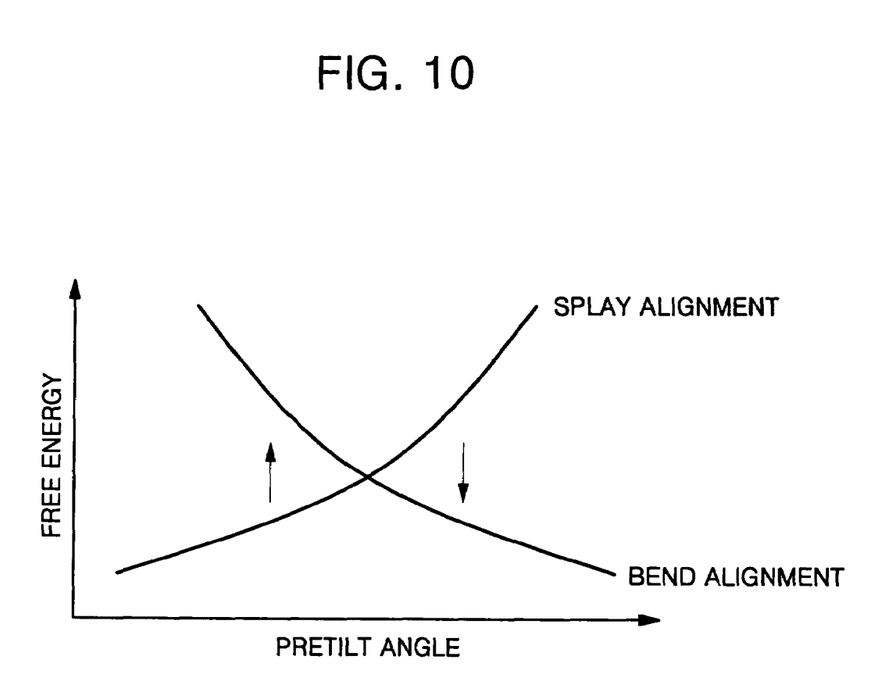
FIG. 10 shows free energies of a splay alignment and a bend alignment according to variations of pretilt angles.

FIG. 10 shows free energies of a splay alignment and a bend alignment according to variations of pretilt angles. Referring to FIG. 10, as the pretilt angle is increased, the free energy of the bend alignment will eventually stabilize to become lower than that of the splay alignment. Because of this, the liquid crystals 300b which are located apart from the protrusion lines 145 and 245 have the splay alignment, and most of the liquid crystals 300a and 300c which are located adjacent to the protrusion lines 145 and 245 have an alignment that is close to the bend alignment. Further, a case where the lower and upper protrusion lines 145 and 245 are formed at locations corresponding to each other has a closer alignment to the bend alignment than a case where the lower or upper protrusion line 145 or 245 is not formed.

Meanwhile, the liquid crystals 300a and 300c which are located on left and right sides of the protrusion lines 145 and 245 differ in direction of the pretilt angle, and thus, there may occur a disclination line therebetween. In this case, by forming the light shielding layer 210 having the width $W_{BM}$ that is the same as or larger than the width $W_{low}$ of the lower protrusion line 145 and/or the width $W_{up}$ of the upper protrusion line 245, a degradation of screen quality due to the disclination line can be substantially reduced or prevented.

The liquid crystal display device may further include a back light device 400 which provides white light to a bottom portion of the lower substrate 100. The liquid crystal display device can implement a color image using the color filter layer 215.

Alternatively, the backlight device 400 may include red (R), green (G) and blue (B) back lights that may be arranged below the lower substrate 100. In this case, the color filter layer 215 is omitted. Such a liquid crystal display device is referred to as a field sequential liquid crystal display (FS-LCD) device. The FS-LCD device time-divisionally and/or sequentially displays red, green and blue lights through a liquid crystal located in one unit pixel and displays a color image using an afterimage effect. This liquid crystal display device has a rapid response speed and thus is suitable for implementing a moving picture.

Figure 6:
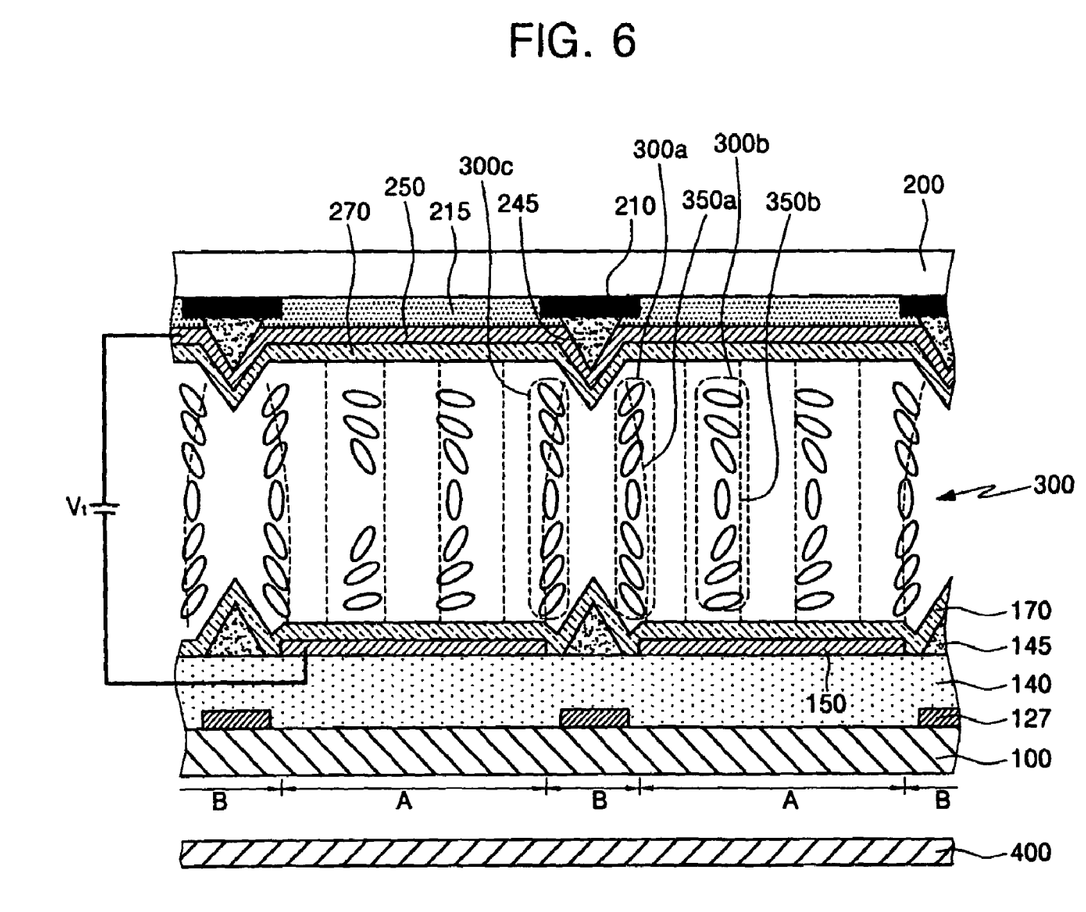
FIG. 6 is a cross-sectional view illustrating a bend transition of the LCD device of FIG. 5.

FIG. 6 is a cross-sectional view illustrating a bend transition of the liquid crystal display device of FIG. 5.

Referring to FIG. 6, a voltage is applied to the pixel electrode 150 and another voltage is applied to the opposite electrode 250, so that the pixel electrode 150 and the opposite electrode 250 have a predetermined voltage difference Vt therebetween. As a result, electric fields 350a and 350b are formed between the pixel electrode 150 and the opposite electrode 250. That is, the electric field 350b in the form of a straight line is formed in a vertical direction in a region where a plane portion of the opposite electrode 250 and another plane portion of the pixel electrode 150 face each other. However, the electric field 350a in the form of a bent line is formed in a vertical direction in a region where a portion of the opposite electrode 250 corresponding to the protrusion line 245 and an edge of the pixel electrode 150 face each other. Since the portion of the opposite electrode 250 corresponding to the protrusion line 245 is relatively closer in distance to the pixel electrode 150 than other portions (e.g., the plane portions), a relatively strong and bended electric field is formed. Due to the bended and strong electric field, among the liquid crystals adjacent to the upper protrusion line 245, the liquid crystals, which remain splay-aligned or are not sufficiently transited to the bend alignment, can now be more rapidly transited to the bend alignment. In short, since the opposite electrode 250 is arranged on the upper protrusion line 245, the electric field can be distorted and can become stronger, so that the liquid crystals adjacent to the upper protrusion line 245 can be sufficiently transited to the bend alignment in a short time.

The bend transition is propagated to the other region from the liquid crystals already transited into the bend alignment, i.e., the transition kernel. Thus, the liquid crystals located in the whole liquid crystal layer 300 are transited to the bend alignment. As a result, due to the liquid crystals now being more rapidly transited to the bend alignment, a time that the bend transition is propagated to the whole liquid crystal layer 300, i.e., a transition time, can be reduced, and a transition voltage, too, can be reduced.

Thereafter, a voltage difference between the pixel electrode 150 and the opposite electrode 250 remains higher than a critical voltage Vcr to maintain the bend alignment. If the voltage difference is increased, a tilt angle of the rest of the liquid crystals, other than the liquid crystals which are adjacent to the alignment layers 170 and 270 and the liquid crystals which are located in central portion, is increased, and if the voltage difference is reduced, the tilt angle is decreased. Thus, polarized light which passes through the liquid crystal layer 300 is modified, thereby forming an image. The variation of the tilt angle of these liquid crystals is of such a fast speed that a rapid response time can be achieved. The liquid crystal display device described above is as an OCB mode LCD device, and, in one embodiment, the OCB mode LCD device is driven by a field sequential driving method to achieve an even faster response speed.

In view of the foregoing, according to an OCB mode LCD device of the present invention, a protrusion line which crosses the alignment direction of an alignment layer is arranged so that a pretilt angle of liquid crystals adjacent to the protrusion line can be increased, thereby more easily inducing a bend transition and reducing a bend transition time. Further, by forming an opposite electrode on an upper protrusion line, a sufficient bend transition can be induced, thereby significantly reducing a bend transition time. Also, by forming a protrusion line having a width that is the same as or smaller than the width of a light shielding layer pattern, a degradation of the display quality can be substantially reduced or prevented.

While the present invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A liquid crystal display device comprising:
a lower substrate;
a plurality of pixel electrodes on the lower substrate;
a lower alignment layer on the pixel electrodes and having a predetermined alignment direction;
an upper substrate spaced apart from the lower substrate and having an opposite surface facing the lower substrate;
an opposite electrode on the opposite surface;
an upper alignment layer on the opposite electrode and having the predetermined alignment direction of the lower alignment layer;
an upper protrusion between the upper substrate and the opposite electrode and extending in a direction crossing the predetermined alignment direction; and
an optically compensated bend (OCB) mode liquid crystal layer between the lower alignment layer and the upper alignment layer,
wherein the lower substrate has opening areas and non-opening area surrounding the opening areas, wherein each of the pixel electrodes is on a corresponding one of the opening areas, and the upper protrusion is between adjacent pixel electrodes and on a region corresponding to the non-opening area between the adjacent pixel electrodes.

2. The device of claim 1, wherein the predetermined alignment direction is substantially perpendicular to the upper protrusion.

3. The device of claim 1, wherein the upper protrusion extends on a region corresponding to the non-opening area which is on longer sides of the pixel electrodes.

4. The device of claim 3, wherein the predetermined alignment direction is a direction crossing the longer sides of the pixel electrodes.

5. The device of claim 1, wherein the upper protrusion extends on a region corresponding to the non-opening area which is on shorter sides of the pixel electrodes.

6. The device of claim 5, wherein the predetermined alignment direction is a direction crossing the shorter sides of the pixel electrodes.

7. The device of claim 1, further comprising a light shielding layer pattern at a location corresponding to the non-opening area.

8. The device of claim 7, wherein, in a region where the light shielding layer pattern and the upper protrusion overlap, a width of the upper protrusion is not greater than a width of the light shielding layer pattern.

9. The device of claim 1, further comprising a color filter between the opposite electrode and the upper substrate and at a location corresponding to one of the pixel electrodes.

10. The device of claim 1, further comprising red, green, and blue backlights, wherein the lower substrate is between the red, green, and blue backlights and the upper substrate.

11. The device of claim 1, wherein the OCB liquid crystal layer has a nematic liquid crystal having a positive dielectric constant anisotropy.

12. A liquid crystal display device comprising:
a lower substrate;
a pixel electrode on the lower substrate;
a lower alignment layer on the pixel electrode and having a predetermined alignment direction;
an upper substrate spaced apart from the lower substrate and having an opposite surface facing the lower substrate;
an opposite electrode on the opposite surface;
an upper alignment layer on the opposite electrode and having the predetermined alignment direction of the lower alignment layer;
an upper protrusion between the upper substrate and the opposite electrode and extending in a direction crossing the predetermined alignment direction; and
an optically compensated bend (OCB) mode liquid crystal layer between the lower alignment layer and the upper alignment layer,
wherein the upper protrusion comprises a plurality of sub-protrusions which are separated from each other.

13. The device of claim 1, wherein at least one side of the upper protrusion has a slope.

14. The device of claim 13, wherein an angle of the slope with respect to the upper substrate is between 10° and 80°.

15. The device of claim 13, wherein a pretilt angle of liquid crystals of the liquid crystal layer adjacent the upper alignment layer and near the upper protrusion is substantially the same as an angle of the slope of the upper protrusion.

16. The device of claim 14, wherein the angle of the slope with respect to the upper substrate is between 10° and 60°.

17. The device of claim 1, further comprising a lower protrusion between the lower substrate and the lower alignment layer and at a location corresponding to the upper protrusion.

18. The device of claim 17, wherein at least one side of the lower protrusion has a slope.

19. The device of claim 18, wherein an angle of the slope with respect to the lower substrate is between 10° and 80°.

20. The device of claim 19, wherein the angle of the slope with respect to the lower substrate is between 10° and 60°.

21. A liquid crystal display device comprising:
a lower substrate;
a data line on the lower substrate;
an insulating layer on the lower substrate and covering the data line;
a plurality of pixel electrodes on the insulating layer;
a lower alignment layer on the pixel electrodes and having a predetermined alignment direction;
an upper substrate spaced apart from the lower substrate and having an opposite surface facing the lower substrate;
an opposite electrode on the opposite surface;
an upper alignment layer on the opposite electrode and having the predetermined alignment direction of the lower alignment layer;
a lower protrusion on the insulating layer and between the lower substrate and the lower alignment layer and extending in a direction crossing the predetermined alignment direction; and
an optically compensated bend (OCB) mode liquid crystal layer between the lower alignment layer and the upper alignment layer,
wherein the lower substrate has opening areas and non-opening area surrounding the opening areas, wherein each of the pixel electrodes is on a corresponding one of the opening areas, and the lower protrusion is between adjacent pixel electrodes and on a region corresponding to the non-opening area between the adjacent pixel electrodes.

22. The device of claim 21, wherein the predetermined alignment direction is substantially perpendicular to the lower protrusion.

23. The device of claim 21, wherein the lower protrusion extends on a region corresponding to the non-opening area which is on longer sides of the pixel electrodes.

24. The device of claim 23, wherein the predetermined alignment direction is a direction crossing the longer sides of the pixel electrodes.

25. The device of claim 21, wherein the lower protrusion extends on a region corresponding to the non-opening area which is on shorter sides of the pixel electrodes.

26. The device of claim 25, wherein the predetermined alignment direction is a direction crossing the shorter sides of the pixel electrodes.

27. The device of claim 21, further comprising a light shielding layer pattern at a location corresponding to the non-opening area, and wherein, in a region where the light shielding layer pattern and the lower protrusion overlap, a width of the lower protrusion is not greater than a width of the light shielding layer pattern.

28. The device of claim 21, wherein at least one side of the lower protrusion has a slope.

29. The device of claim 28, wherein an angle of the slope with respect to the lower substrate is between 10° and 80°.

30. The device of claim 29, wherein the angle of the slope with respect to the lower substrate is between 10° and 60°.

31. The device of claim 21, further comprising a color filter between the opposite electrode and the upper substrate and at a location corresponding to one of the pixel electrodes.

32. The device of claim 21, further comprising red, green, and blue backlights, wherein the lower substrate is between the red, green, and blue backlights and the upper substrate.

33. The device of claim 21, wherein the OCB liquid crystal layer has a nematic liquid crystal having a positive dielectric constant anisotropy.

34. The device of claim 1, wherein
the liquid crystal layer is between the upper protrusion and the lower alignment layer.

35. The device of claim 1, wherein
the upper protrusion has a substantially triangular shape in a plane that is perpendicular to the direction crossing the predetermined alignment direction.

36. The device of claim 21, wherein the liquid crystal layer is between the lower protrusion and the upper alignment layer.

37. The device of claim 21, wherein the lower protrusion has a substantially triangular shape in a plane that is perpendicular to the direction crossing the predetermined alignment direction.

38. The device of claim 1, wherein a pretilt angle of liquid crystals of the liquid crystal layer adjacent the upper alignment layer and near the upper protrusion is greater than a pretilt angle of liquid crystals of the liquid crystal layer adjacent the upper alignment layer and distant from the upper protrusion.

39. A liquid crystal display device comprising:
a lower substrate;
a data line on the lower substrate;
an insulating layer on the lower substrate and covering the data line;
a pixel electrode on the insulating layer;
a lower alignment layer on the pixel electrode and having a predetermined alignment direction;
an upper substrate spaced apart from the lower substrate and having an opposite surface facing the lower substrate;
an opposite electrode on the opposite surface;
an upper alignment layer on the opposite electrode and having the predetermined alignment direction of the lower alignment layer;
a lower protrusion on the insulating layer and between the lower substrate and the lower alignment layer and extending in a direction crossing the predetermined alignment direction; and
an optically compensated bend (OCB) mode liquid crystal layer between the lower alignment layer and the upper alignment layer,
wherein the lower protrusion comprises a plurality of sub-protrusions which are separated from each other.

* * * * *

UNITED STATES PATENT AND TRADEMARK OFFICE
CERTIFICATE OF CORRECTION

| | | |
|---|---|---|
| PATENT NO. | : 7,649,600 B2 | Page 1 of 1 |
| APPLICATION NO. | : 11/271406 | |
| DATED | : January 19, 2010 | |
| INVENTOR(S) | : Kyung-Ho Choi et al. | |

It is certified that error appears in the above-identified patent and that said Letters Patent is hereby corrected as shown below:

Column 9, Claim 1, line 24    After "and"
                   Insert --a--

Column 10, Claim 21, line 58   After "and"
                   Insert --a--

Signed and Sealed this
First Day of March, 2011

David J. Kappos
*Director of the United States Patent and Trademark Office*